United States Patent
Tule

(10) Patent No.: US 10,019,335 B2
(45) Date of Patent: Jul. 10, 2018

(54) SYSTEMS AND METHODS FOR PROCESSING TEST RESULTS

(71) Applicant: SKYWORKS SOLUTIONS, INC., Woburn, MA (US)

(72) Inventor: Jesus Alejandro Tule, Mexicali (MX)

(73) Assignee: Skyworks Solutions, Inc., Woburn, MA (US)

( * ) Notice: Subject to any disclaimer, the term of this patent is extended or adjusted under 35 U.S.C. 154(b) by 0 days.

(21) Appl. No.: 14/837,356

(22) Filed: Aug. 27, 2015

(65) Prior Publication Data

US 2016/0062865 A1    Mar. 3, 2016

Related U.S. Application Data

(60) Provisional application No. 62/043,979, filed on Aug. 29, 2014.

(51) Int. Cl.
*G06F 11/00* (2006.01)
*G06F 11/32* (2006.01)
*G06F 11/273* (2006.01)

(52) U.S. Cl.
CPC .......... *G06F 11/321* (2013.01); *G06F 11/273* (2013.01)

(58) Field of Classification Search
CPC .. G06F 11/321; G06F 11/273; G06F 11/3672; G06F 11/3692; G06F 11/3409; G06F 11/25
USPC ...................... 714/46, 25, 37, 38.1
See application file for complete search history.

(56) References Cited

U.S. PATENT DOCUMENTS

| | | | | |
|---|---|---|---|---|
| 5,822,717 A * | 10/1998 | Tsiang | ............... | G01R 31/2831 324/719 |
| 2001/0052089 A1* | 12/2001 | Gustavsson | ......... | G06F 11/3692 714/38.1 |
| 2003/0200483 A1* | 10/2003 | Sutton | ................ | G01R 31/2849 714/25 |
| 2004/0158409 A1* | 8/2004 | Teshima | .................. | H01J 37/28 702/22 |
| 2007/0170939 A1* | 7/2007 | Park | .................... | G01R 31/2886 324/750.01 |
| 2008/0155354 A1* | 6/2008 | Kolman | ........... | G01B 31/31831 714/45 |
| 2011/0178967 A1* | 7/2011 | Delp | ................... | G05B 23/0229 706/20 |
| 2011/0298630 A1* | 12/2011 | Kiyokawa | .......... | G01R 31/2862 340/686.1 |

* cited by examiner

*Primary Examiner* — Joseph D Manoskey
(74) *Attorney, Agent, or Firm* — Chang & Hale LLP

(57) ABSTRACT

Systems and methods for processing test results. A method of analyzing test results includes receiving a set of test result files, the set of test result files including a plurality of test results. The method also includes identifying a set of data filters based on one or more of the set of test result files or user input. The method further includes generating filtered results based on the set of data filters and the set of test result files, the filtered results including one or more of a subset of the plurality of test results or reordered test results. The method further includes providing a visual representation of the filtered results.

20 Claims, 11 Drawing Sheets

FIG.4

| | A | B | C | D | E | F | | | | | |
|---|---|---|---|---|---|---|---|---|---|---|---|
| 1 | Spreadshe | Format | | | | | QuickView | | | | |
| 2 | Test Progr | 77523a_D3(Prod) No Version# | | | | | Open SPD file | | | | |
| 3 | Lot ID: | 36633911P1 | | | | | Open CSV file | | | | |
| 4 | Operator: | operator | | | | | RUN QuickView Report | ◁ | — 410 | | |
| 5 | | | | | | | Save As Excel Worksheet | | | | |
| 6 | Date: | ######## | | | | | Generate Chart Options | △ | | | |
| 7 | | | 1.01.01 | 1.02.01 | 1.02.02 | 1.03.01 | Sort Parameters Table by Failure Mode | | | | |
| 8 | | | Site | VPACEN_ | VBS1_n10 | LKCC_L | Format CRED CSV for JMP | △ | | | |
| 9 | | | | | | | Format FEM CSV for JMP | △ | | | |
| 10 | | | none | −0.4 | −0.4 | | Run Report on Multiple Files | | | | |
| 11 | | | none | −0.9 | −0.9 | −0.9 | UnHide all Sheets | | | | |
| 12 | Serial# | Bin# | UNIT | V | V | none | Display Version | | none | none | uA |
| | | | | | | uA | | | uA | uA | |

SYSTEMS AND METHODS FOR PROCESSING TEST RESULTS

CROSS-REFERENCE TO RELATED APPLICATION(S)

This application claims priority to U.S. Provisional Application No. 62/043,979 filed Aug. 29, 2014, entitled SYSTEMS AND METHODS FOR PROCESSING TEST RESULTS. The contents of each of the above-referenced application(s) are hereby expressly incorporated by reference herein in their entireties for all purposes.

BACKGROUND

Field

The present disclosure generally relates to systems and methods for processing test results.

Description of Related Art

Test apparatuses may be devices and/or systems that may be used to perform tests on electronic devices and/or components. The test apparatuses may generate test results and/or test result files that include the test results (e.g., the results of the tests performed on the electronic devices and/or components).

SUMMARY

In some implementations, the present disclosure relates to a method of analyzing test data. The method includes receiving a set of test result files, the set of test result files including a plurality of test results. The method also includes identifying a set of data filters based on one or more of the set of test result files or user input. The method further includes generating filtered results based on the set of data filters and the set of test result files, the filtered results including one or more of a subset of the plurality of test results or reordered test results. The method further includes providing a visual representation of the filtered results.

In some embodiments, identifying the set of filters includes providing a list of data filters based on the set of test result files.

In some embodiments, identifying the set of filters further includes receiving the user input, the user input indicating the set of data filters.

In some embodiments, the plurality of test results are generated by one or more test apparatuses, the one or more test apparatus including a plurality of test arms.

In some embodiments, generating the filtered results includes obtaining a test schedule of the plurality of tests, the test schedule including an order of the plurality of tests and identifying the one or more test apparatuses and the plurality of test arms.

In some embodiments, generating the filtered results further includes identifying tests performed using a first test arm of the plurality of test arms based on the test schedule.

In some embodiments, generating the filtered results further includes identifying tests performed by a first testing apparatus from the one or more testing apparatuses based on the test schedule.

In some embodiments, the set of data filters includes a first data filter for identifying a test location.

In some embodiments, the set of data filters includes a first data filter for identifying a type of a test.

In some embodiments, the set of data filters includes a first data filter for identifying a type of a failure.

In some embodiments, the set of data filters includes a first data filter for identifying a type of a component being tested.

In some embodiments, the set of data filters includes a first data filter for identifying an individual test.

In some embodiments, the visual representation includes one or more of text, an image, a table, a graph, a chart, or a list.

In some embodiments, providing the visual representation includes communicating with a spreadsheet application to generate the visual representation.

In some embodiments, the reordered test results includes one or more of plurality of test results in a different order.

In some implementations, the present disclosure relates to a system for analyzing test data. The system includes a memory and a processor communicatively coupled to the memory. The processor is configured to receive a set of test result files, the set of test result files including a plurality of test results, identify a set of data filters based on one or more of the set of test result files or user input, generate filtered results based on the set of data filters and the set of test result files, the filtered results including one or more of a subset of the plurality of test results or reordered test results, and provide a visual representation of the filtered results.

In some embodiments, the processor is configured to identify the set of filters by providing a list of data filters based on the set of test result files.

In some embodiments, the processor is further configured to identify the set of filters by receiving the user input, the user input indicating the set of data filters.

In some embodiments, the plurality of test results are generated by one or more test apparatuses, the one or more test apparatus including a plurality of test arms.

In some embodiments, the processor is configured to generate the filtered results by obtaining a test schedule of the plurality of tests, the test schedule including an order of the plurality of tests and identifying the one or more test apparatuses and the plurality of test arms.

In some embodiments, the processor is further configured to generate the filtered results by identifying tests performed using a first test arm of the plurality of test arms based on the test schedule.

In some embodiments, the processor is further configured to generate the filtered results by identifying tests performed by a first testing apparatus from the one or more testing apparatuses based on the test schedule.

In some embodiments, the set of data filters includes a first data filter for identifying a test location.

In some embodiments, the set of data filters includes a first data filter for identifying a type of a test.

In some embodiments, the set of data filters includes a first data filter for identifying a type of a failure.

In some embodiments, the set of data filters includes a first data filter for identifying a type of a component being tested.

In some embodiments, the set of data filters includes a first data filter for identifying an individual test.

In some embodiments, the visual representation includes one or more of text, an image, a table, a graph, a chart, or a list.

In some embodiments, providing the visual representation includes communicating with a spreadsheet application to generate the visual representation.

In some embodiments, the reordered test results includes one or more of plurality of test results in a different order.

In some implementations, the present disclosure relates to a non-transitory computer readable storage medium including instructions that, when executed by a processor, cause the processor to perform operations. The operations include receiving a set of test result files, the set of test result files including a plurality of test results. The operations also include identifying a set of data filters based on one or more of the set of test result files or user input. The operations further include generating filtered results based on the set of data filters and the set of test result files, the filtered results including one or more of a subset of the plurality of test results or reordered test results. The operations also include providing a visual representation of the filtered results.

In some embodiments, identifying the set of filters includes providing a list of data filters based on the set of test result files.

In some embodiments, identifying the set of filters further includes receiving the user input, the user input indicating the set of data filters.

In some embodiments, the plurality of test results are generated by one or more test apparatuses, the one or more test apparatus including a plurality of test arms.

In some embodiments, the filtered results includes obtaining a test schedule of the plurality of tests, the test schedule including an order of the plurality of tests and identifying the one or more test apparatuses and the plurality of test arms.

In some embodiments, generating the filtered results further includes identifying tests performed using a first test arm of the plurality of test arms based on the test schedule.

In some embodiments, generating the filtered results further includes identifying tests performed by a first testing apparatus from the one or more testing apparatuses based on the test schedule.

In some embodiments, the set of data filters includes a first data filter for identifying a test location.

In some embodiments, the set of data filters includes a first data filter for identifying a type of a test.

In some embodiments, the set of data filters includes a first data filter for identifying a type of a failure.

In some embodiments, the set of data filters includes a first data filter for identifying a type of a component being tested.

In some embodiments, the set of data filters includes a first data filter for identifying an individual test.

In some embodiments, the visual representation includes one or more of text, an image, a table, a graph, a chart, or a list.

In some embodiments, providing the visual representation includes communicating with a spreadsheet application to generate the visual representation.

In some embodiments, the reordered test results includes one or more of plurality of test results in a different order.

BRIEF DESCRIPTION OF THE DRAWINGS

FIG. 4 is a diagram illustrating an example GUI 400 according to one embodiment of the present disclosure.

DETAILED DESCRIPTION OF SOME EMBODIMENTS

The headings provided herein, if any, are for convenience only and do not necessarily affect the scope or meaning of the claimed invention.

Test apparatuses (e.g., devices and/or systems that may be used to perform tests on electronic devices and/or components) may generate test results and/or test result files that include the test results. Special purpose software (e.g., special purpose applications) may often be used to analyze and/or process the test result files. The special purpose software may be expensive and/or difficult to use without special training. The special purpose software may also not be capable of filtering out different types of data and/or information in the test result files that may be useful to a user.

Disclosed are non-limiting examples of systems and/or methods related to processing and/or analyzing test results. In some embodiments, such techniques may be implemented in, for example, a test application on a computing device (e.g., a desktop computer, a laptop computer, a tablet computer, a smartphone, etc.). The test application may use data filters to identify test results of tests performed at one or more test locations (e.g., sites), to identify test results of test performed by a particular test apparatus or test arm, to identify test results of a particular type of test, to identify test results of tests performed on a type of electronic component/device, to identify test results that may indicate particular failures or types of failures, and/or to identify particular parameters and/or values of the tests and/or test results. Although described in the context of processing and/or analyzing test results for tests performed on electronic components and/or devices, it will be understood that one or more features of the present disclosure may also be utilized in other applications.

Figure 1:
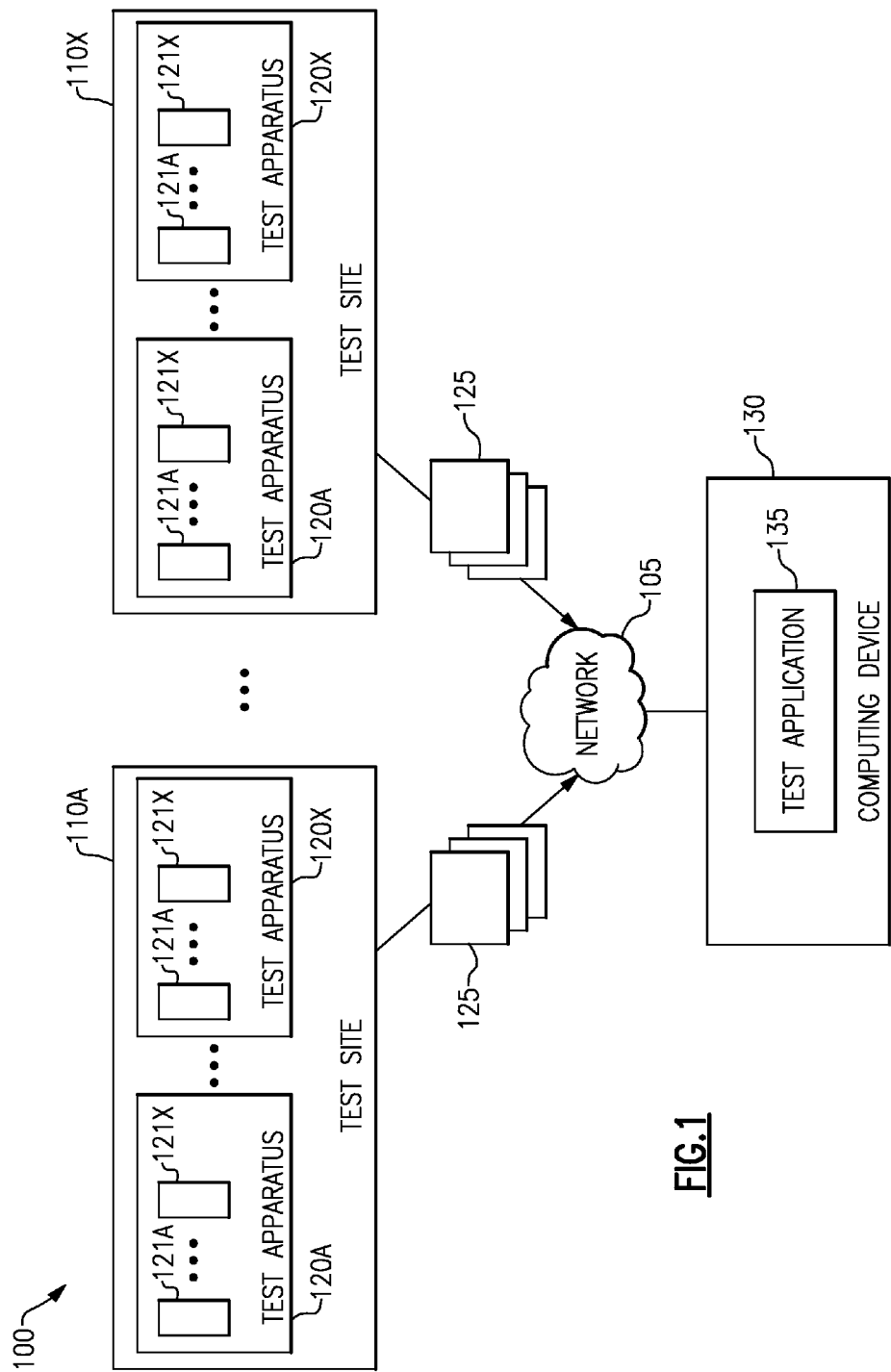
FIG. 1 illustrates an example system architecture 100, in accordance with one embodiment of the present disclosure.

FIG. 1 illustrates an example system architecture 100, in accordance with one embodiment of the present disclosure. The system architecture 100 includes test sites 110A through 110X, test apparatuses 120A through 120X, network 105, and a computing device 130. Examples of computing devices may include, but are not limited to, devices such as personal computers (PCs), server computers, laptops, mobile phones, smart phones, tablet computers, netbook computers etc. In one embodiment, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, computing devices (e.g., a server computer), and/or a combination thereof.

In one embodiment, test sites 110A through 110X may be geographical locations where electronic components and/or devices (e.g., power amplifiers, voltage regulators, radio frequency (RF) components/modules, wireless devices such as tablet computers, smartphones, etc.) may be tested. For example, the operation of an electronic component may be tested to determine whether the electronic component operates properly. Examples of geographical locations may include, but are not limited to, factories, manufacturing plants, buildings, sites (e.g., groups of buildings or structures), cities, counties, states, provinces, regions, and countries, etc. Examples of electronic components and/or devices may include, but are not limited to, amplifiers (e.g., power amplifiers), attenuators, circulators, demodulators, detectors, diodes, directional couplers, RF front-end modules, isolators, lighting and display solutions, mixers, modulators, optocouplers, optoisolators, phase shifters, power dividers/combiners, power management devices, RF receivers, RF switches, voltage regulators, etc.

The test sites 110A through 110X include test apparatuses 120A through 120X. A test apparatus may be a device or a combination of devices (e.g., a system) that may be used to test the operation, functionality, tolerances, and/or conformance of electronic components and/or devices. In one embodiment, each test site 110A through 110X may include any number of test apparatuses and/or may include one or more different types of test apparatuses. Different types of test apparatuses (e.g., different models of test apparatuses) may be used to test different types of electronic components and/or devices. For example, site 110A may include ten test apparatuses to test power amplifiers and three test apparatuses to test RF receivers and site 110X may include five test apparatuses to test phase shifters and three test apparatuses to test attenuators.

Figure 2:
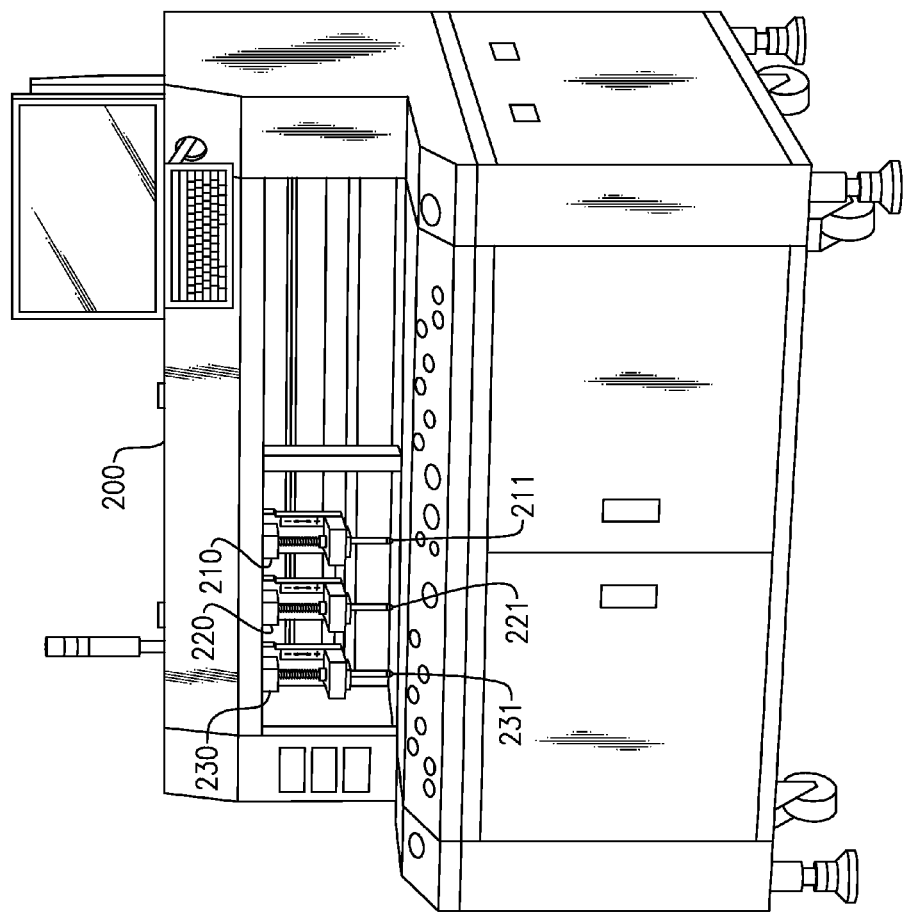
FIG. 2 is a diagram illustrating an example test apparatus 200 according to one embodiment of the present disclosure.

In one embodiment, a test apparatus (e.g., test apparatus 120A in site 110A) may include a plurality of test arms (as illustrated and discussed in more detail in conjunction with FIG. 2). The test arms may include sensing elements (e.g., sensors) that may be used to perform tests on electronic devices and/or components (as discussed in more detail in conjunction with FIG. 2). A test apparatus with multiple test arms may be able to perform tests on multiple electronic devices and/or components simultaneously. This may allow the test apparatus to perform tests on electronic devices and/or components more quickly.

As discussed above, the test apparatuses 120A through 120X of the sites 110A through 110X may be used to test the operation, functionality, tolerances, and/or conformance of electronic components and/or devices. The test apparatuses 120A through 120X may perform (e.g., run, conduct, etc.) the tests and may generate test result files 125. The test result files 125 may include the results of the tests performed by the test apparatuses 120A through 120X of the sites 110A through 110X and/or may include data indicative of the results of the tests. In one embodiment, the test result files 125 may be provided to the computing device 130 via the network 105. For example, the test apparatuses 120A through 120X may periodically transmit the test results files 125 to the computing device 130 (e.g., transmit the test result files 125 when a test apparatus finishes performing a set of tests or transmit the test result files 125 hourly, daily, weekly, etc.). In another example, the computing device 130 may request (e.g., send a request) for the test result files 125 and the test apparatuses 120A through 120X may transmit the test result files 125 to the computing device 130 based on the request. In one embodiment, the test result files 125 may be comma separated value (CSV) files. In another embodiment, the test result files 125 may use other characters (e.g., a ";", a "*", etc.) to delimit and/or separate data and/or values in the test result files 125. In other embodiments, the test result files 125 may be in any number of different formats.

In embodiment, the test result files 125 may be stored on a data store (not show in the figures). The data store may be may be a memory (e.g., random access memory), a cache, a drive (e.g., a hard drive), a flash drive, a database system, and/or another type of component or device capable of storing data. The data store may also include multiple storage components (e.g., multiple drives or multiple databases) that may also span multiple computing devices (e.g., multiple server computers).

The computing device 130 includes a test application 135. In one embodiment, the test application 135 may be an application (e.g., an app, a program, software, a service, etc.) that allows a user of the computing device 130 to view, visualize, process, filter, and/or analyze the test result files 125 more quickly, easily, and/or efficiently. The test application 135 may be a cost effective tool for processing, filtering, and/or analyzing the test result files 125. The test application 135 may also provide intuitive user interfaces to allow users to more easily process, filter, and/or analyze the test result files 125. In one embodiment, the test application 135 may operate and/or execute in conjunction with a spreadsheet application. For example, the test application 135 may be an add-in module/component for the spreadsheet application (e.g., plug-in, extension, add-on, etc.). The test application 135 may communicate and/or interact with the spreadsheet application to view, visualize, process, filter, and/or analyze the test result files 125. In another embodiment, the test application 135 may be standalone application (e.g., may be an application capable of executing and/or operating by itself).

In one embodiment, the testing application 135 may identify a set of data filters (e.g., one or more data filters) that may be used to filter, analyze, and/or process the test results in the test result files 125. A data filter may allow the test application 135 to identify certain types of information and/or data that are stored in the test result files 125. For example, a data filter may allow the test application 135 to identify test results that indicate failures or that indicate particular types of failures, to identify test results for test performed on a particular type of electronic component and/or device, to identify test results for tests performed at a particular site, and/or to identify test results for tests performed by a particular test apparatus and/or a particular test arm. In another example, the data filters may allow the test application 135 to identify particular parameters and/or values of the tests and/or test results. For example, the data filters may allow the test application 135 to identify tests and/or test results where a particular input value (e.g., a particular voltage) was used. In one embodiment, the data filters may use regular expressions (e.g., pattern matching) to identify certain types of information and/or data that are stored in the test result files 125.

In another embodiment, the test application 135 may generate filtered results using the set of data filters and may provide a visual representation of the filtered results to the user. For example, the test application 135 may provide (e.g., present and/or display) one or more of text, an image, a picture, a table, a graph, a chart, and a list to the user of the computing device. The filtered results may include a subset of the test results in the test result files 125. For example, the filtered results may include results that indicate a failure or may include results of tests performed at a particular site. The filtered results may also include reordered test results from the test result files 125. For example, the filtered results may include the test results (or a subset of the test results) in a different order. The filtered results may also include a subset of the data in the test results files 125. For example, the filtered results may include the value of a particular parameter or measurement.

In one embodiment, the test application 135 may use one or more data filters to identify results performed by a particular set (e.g., one or more) of test apparatuses and/or a particular set of test arms. For example, the test application 135 may obtain a test schedule (or data indicative of the test schedule). The test schedule may include data to indicate and/or identify which tests were performed by the test apparatuses 120A through 120X, which test arms of the test apparatuses 120A through 120X performed the tests, and the order of the tests (e.g., the order in which the tests were performed by the test apparatuses 120A through 120X and the test arms). The test application 135 may use one or more data filters and the test schedule to identify test results for tests performed at a particular site, tests performed by a particular test apparatus (e.g., test apparatus 120A), and/or tests performed by a particular test arm of a test apparatus.

In one embodiment, the test application 135 may use one or more data filters to identify test results of tests performed at one or more test locations (e.g., a geographical location, a test site such as test site 110A, etc.). In another embodiment, the test application 135 may use one or more data filters to identify test results of a particular type of test (e.g., a test to measure the amount of RF produced by an electronic component and/or device). In a further embodiment, the test application 135 may use one or more data filters to identify test results of tests performed on a type of electronic component and/or device (e.g., tests performed on power amplifiers or tests performed on modulators). In one embodiment, the test application 135 may use one or more data filters to identify test results that may indicate particular failures and/or types of failures. For example, the one or more data filters may identify failures where the test result was above a threshold value or below a threshold value. In another embodiment, the test application 135 may use one or more data filters to identify test results for particular tests that were performed by the test apparatuses 120A through 120X.

In one embodiment, the test application 135 may allow a user of the computing device 130 to process, filter, and/or analyze the test result files 125 more quickly, easily, and/or efficiently. The test application 135 may use one or more data filters to format, reorder, reorganize, and/or filter the raw data or information in the test files 124 for easier analysis. The test application 135 may provide information such as the overall yield of tests performed by the test apparatuses 120A through 120X (e.g., the percentage of electronic components and/or devices that passed and/or failed the tests). The test application 135 may also provide information such as the total number of electronic components and/or devices that passed/failed an individual test and the percentages of passes/failures for an individual test. The test application 135 may further provide statistical data such as the mean, median, and standard deviation for the tests performed by the test apparatuses 120A through 120X. The test application 135 may provide a Pareto chart (e.g., a chart that includes bars and a line graph) to present the results (or a subset of the results) of the tests performed by the test apparatuses 120A through 120X. The Pareto chart may include information such as the tests that have the most failure test results (e.g., the top ten failed tests).

As discussed above, the data filters may be used to identify tests that were performed at a particular site (e.g., site 110A), performed by a particular test apparatus (e.g., test apparatus 120A), and/or performed by a test arm of a test apparatus. The data filters may allow the test application 135 to provide information such as the yield from a particular site, the yield from a particular test apparatus, and/or the yield from a particular test arm. This may allow the user identify problems with one or more of the test apparatuses 120A through 120X. For example, the test application may provide a visual representation (e.g., a graph) of test results and the graph may indicate that a larger number of tests performed by a test arm of a test apparatus result in failures. This may indicate that the test arm is not operating properly (e.g., the test arm is malfunctioning or is not calibrated properly). The visual representation may allow the user to identify the test arm that is not operating properly. This may also allow the user to identify performance variations and/or manufacturing process variations for electronic components and/or devices that are tested at a particular site. For example, the test application 135 may allow the user to determine that power amplifiers tested at site 110A do not perform as well as power amplifiers manufactured at site 110X. This may indicate that there may be a problem with the manufacturing process at site 110A.

FIG. 2 is a diagram illustrating an example test apparatus 200 according to one embodiment of the present disclosure. As discussed above, the test apparatus 200 may be a device or a combination of devices (e.g., a system) that may be used to test the operation, functionality, tolerances, and/or conformance of electronic components and/or devices (e.g., power amplifiers, attenuators, RF receives, RF switches, RF front-end modules, modulators, demodulators, attenuators, etc.). An electronic component and/or device that may be tested by the test apparatus 200 may also be referred to as a device under test (DUT). The test apparatus 200 may be located in geographical location (e.g., a test site, a factory, a manufacturing plant, a building, a city, a county, a state, a province, a region, a country, etc.).

The test apparatus 200 includes three test arms, test arm 210, test arm 220, and test arm 230. Each of the test arms 210, 220, and 230 may be used to perform one or more tests on an electronic component and/or device. The multiple test arms 210, 220, and 230 may allow the test apparatus 200 simultaneously test the operation, functionality, tolerances, and/or conformance of three electronic components and/or devices. In one embodiment, the test arms 210, 220, and 230 may be movable to different X, Y, and/or Z positions/locations. The term "Z" may define a vertical direction and/or distance relative to the DUT. The terms "X" and "Y" may define lateral directions and/or distances relative to the DUT. In some implementations, the value of Z (height above the DUT) may be held substantially uniform (e.g., at approximately 1 mm) while tests are performed and/or measurements are made at different X and Y locations. The test arms 210, 220, and 230 may be separately movable. For example, each of the test arms 210, 220, and 230 may be movable independent of each other. The test arms 210, 220, and 230 may also be moveable in tandem. For example, the test arms 210, 220, and 230 may all move in the same direction at the same time.

Test arm 210 includes a sensing element 211. Test arm 220 includes a sensing element 221. Test arm 230 includes a sensing element 231. In one embodiment, the sensing elements 211, 221, and 231 may be sensors configured to measure and/or test the operation, functionality, tolerances, and/or conformance of electronic components and/or devices. For example, sensing element 211 may be a sensor configured to detect RF signals, RF noise, electromagnetic interference (EMI), etc.). The sensor may measure RF signals or electromagnetic (EM) emissions that may emanate from a DUT (e.g., an RF module, a power amplifier, etc.) while the DUT is in operation. The sensor may also measure RF signals or EM emissions that emanate from outside the RF module 1215 and may enter the RF module 1215.

Figure 3:
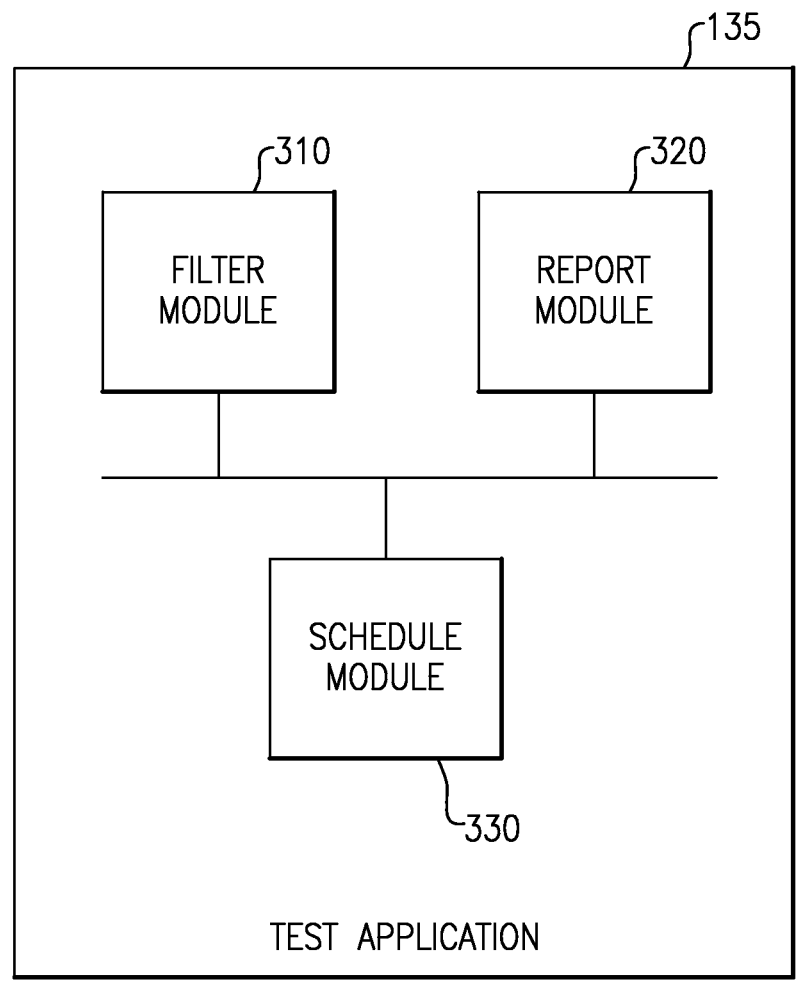
FIG. 3 is a block diagram illustrating an example test application 135 according to one embodiment of the present disclosure.

FIG. 3 is a block diagram illustrating an example test application 135 according to one embodiment of the present disclosure. The test application 135 includes a filter module 310, a report module 320, and a schedule module 330. More or less components may be included in the test application 135 without loss of generality. For example, two of the modules may be combined into a single module, or one of the modules may be divided into two or more modules. In one embodiment, one or more of the modules may reside on different computing devices (e.g., different server computers). The test application 135, the filter module 310, the report module 320, and the schedule module 330 may each be processing logic that includes hardware (e.g., circuitry, dedicated logic, programmable logic, microcode, etc.), software (e.g., instructions run on a processor to perform hardware simulation), firmware, or a combination thereof. The test application 135 may be a standalone application or may be an add-in module/component for the spreadsheet application (e.g., plug-in, extension, add-on, etc.). When the test application 135 is an add-in module/component, the test application may communicate and/or interact with a spreadsheet application (e.g., may communicate data between the test application 135 and the spreadsheet application and/or may use functions, procedures, etc., of the spreadsheet application).

As discussed above, one or more test apparatuses (e.g., test apparatuses 120A through 120X illustrated in FIGS. 1 and 2) may perform one or more tests to test the operation, functionality, tolerances, and/or conformance of electronic components and/or devices. The one or more test apparatuses may generate test result files (e.g., test result files 125 illustrated in FIG. 1) and test result files may be provided to the test application 135 (as discussed above).

In one embodiment, the filter module 310 identify a set of data filters that may be used by the test application 135 to process, filter, and/or analyze test result files (e.g., test result files 125 illustrated in FIG. 1). For example, the filter module 310 may analyze the test result files to determine the type of the test apparatus that performed the tests. The filter module 310 may identify a list (e.g., a set or one or more data filters) that may be used to analyze and/or process test result files. For example, a first type of test apparatus (e.g., a test apparatus that tests power amplifiers) may generate test result files in a first format and the filter module 310 may identify a list of data filters that may be used to process, filter, and/or analyze test files in the first format. The filter module 310 may present the list of data filters (or data indicative of the list of data filters) to the user (e.g., may display the list of data filters to the user). The filter module 310 may receive user input indicating or identifying the set of data filters. For example, the user may provider user input indicate that the data filters that identify an individual test, that identify a test arm of a test apparatus, and that identify failure test results should be used.

In one embodiment, the schedule module 330 may obtain a test schedule for a plurality of tests performed by one or more test apparatuses. For example, the schedule module 330 may obtain a file that includes the test schedule (e.g., may retrieve the file from a data base or from another computing device). In another example, the schedule module 330 may provider a user interface (e.g., a graphical user interface (GUI) that may include various text fields, buttons, menus, etc.) to allow users to input the test schedule. The test schedule may include data to indicate and/or identify which tests were performed by the one or more test apparatuses, which test arms of the test apparatuses performed the tests, and/or the order of the tests (e.g., the order in which the tests were performed by the one or more test apparatuses and/or the test arms). For example, referring to FIG. 1, the test schedule may indicate that a plurality of tests was performed on test apparatuses 120A and 120B in site 110A, that tests were performed using test arms 121A and 121B of the test apparatuses 120A and 120B, and may indicate the order in which the test apparatuses 120A and 120B and test arms 121A and 121B performed the plurality of tests.

The test application 135 may use one or more data filters and the test schedule to identify test results for tests performed at a particular site, to identify tests performed by a particular test apparatus (e.g., test apparatus 120A), and/or to identify tests performed by a particular test arm of a test apparatus. Based on the test schedule obtained by the schedule module 330, the filter module 310 may identify data filters that may be used to identify test results for tests performed at a particular site, to identify tests performed by a particular test apparatus, and/or to identify tests performed by a particular test arm of a test apparatus. For example, a test apparatus at a site may include three test arms and a test schedule may indicate that the tests are performed in groups of three such that the first test arm performs every first test, the second test arm performs every second test, and the third test arm performs every third test. The filter module 310 may identify filters allow the test application 135 to identify tests performed at the site, to identify tests performed by the test apparatus, and to identify tests performed by each individual test arm. For example, each line in a test result file may be a test result. The first, fourth, seventh, tenth, etc., lines may be test results from the first test arm. The second, fifth, eighth, eleventh, etc., lines may be test results from the second test arm. The third, sixth, ninth, twelfth, etc., lines may be test results from the third test arm. The one or more data filters may be used to identify the test results for the first arm (e.g., the first, fourth, seventh, tenth, etc., lines).

In other embodiments, the one or more data filters identified by the filter module 310 may also be used by the test application 135 to identify test results of tests performed at one or more test locations, to identify test results of a particular type of test, to identify test results of tests performed on a type of electronic component/device, to identify test results that may indicate particular failures, and/or to identify particular parameters and/or values of the tests and/or test results.

In one embodiment, the report module 320 may use the one or more data filters identify by the filter module 310 to process, filter, and/or analyze the test results and/or test result files. The report module 320 may generate filtered test results. The filtered test results may include a subset of the test result and/or test results in a different order than the order in the test result files (e.g., reordered test results). For example, the report module 320 may use the one or more data filters to generate filtered test results that include test results of tests performed on a particular type of electronic device/component or that include test results of tests performed by a particular test arm. The report module 320 may generate and/or provide a visual representation of the filtered test results. For example, the report module may generate one or more of an image, a picture, text, a table, a graph, a chart, and a list (as illustrated in FIGS. 6-9).

As discussed above, in one embodiment, the test application 135 may be may be an add-in module/component for a spreadsheet application (e.g., plug-in, extension, add-on, etc.). The report module 320 may communicate/interact with the spreadsheet application and may use functions, operations, methods, etc., of the spreadsheet application to generate the visual representation. For example, the report module 320 may use libraries (e.g., dynamically linked libraries (DLLs)), application programming interfaces (APIs), etc., to generate, provide, and/or present the visual representation (e.g., graph, chart, text, etc.) to the user via a GUI of the spreadsheet application.

FIGS. 4-9 illustrate example GUIs and/or visual representations of test results (or filtered test results) according to embodiments of the present disclosure. The example GUIs and visual representations may include text, images, pictures, tables, graphs, charts, lists, text fields, checkboxes, text boxes, buttons, menus, and/or various other user interface elements. The example GUIs and/or visual representations may be provided, presented, and/or displayed by a test application (e.g., test application 135 illustrated in FIGS. 1 and 3).

FIG. 4 is a diagram illustrating an example GUI 400 according to one embodiment of the present disclosure. The GUI 400 may be presented, provided, and/or displayed by a test application (as illustrated in FIGS. 1 and 3) and/or by a spreadsheet application. The GUI 400 includes various menus (e.g., a "File" dropdown menu, a "Tools" dropdown menu, etc.). The test application may be accessed by using the "QuickView" drop down menu. For example, the user may select and/or click the "QuickView" drop down menu and may click and/or select the menu item 410 to use the test application (e.g., to initiate execution of the test application or to start the test application). The GUI 400 also includes test results from one or more test files that are received from and/or generated by one or more test apparatuses.

Figure 5:
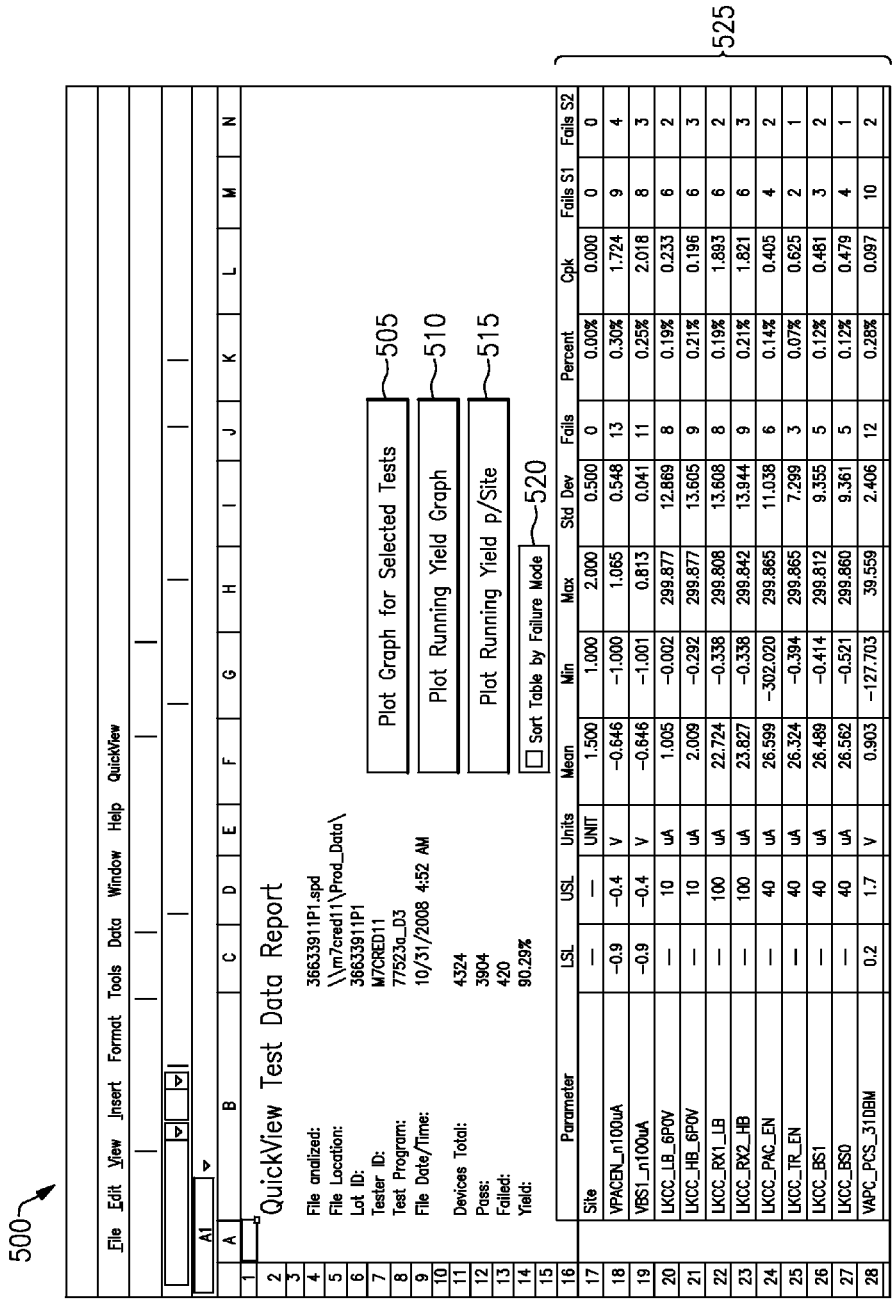
FIG. 5 is a diagram illustrating an example GUI 500 according to one embodiment of the present disclosure according to one embodiment of the present disclosure.

FIG. 5 is a diagram illustrating an example GUI 500 according to one embodiment of the present disclosure according to one embodiment of the present disclosure. The GUI 500 may be presented, provided, and/or displayed by a test application (e.g., test application 135 illustrated in FIGS. 1 and 3). The GUI 500 includes various menus (e.g., a "File" dropdown menu) and buttons 505, 510, and 515. Button 505 may allow a user to plot a graph and/or a chart for one or more selected tests (e.g., as illustrated in FIGS. 6-9). Button 510 may allow a user to plot a running yield graph for electronic devices and/or components that were tested by one or more test apparatuses. Button 515 may allow a user to plot a running yield graph for electronic devices and/or components that were tested by one or more test apparatuses in a particular site (as illustrated in FIG. 9). The portion 525 of the GUI 500 may include test results of test performed by one or more test apparatuses and/or test arms. The test results include information and/or data such the site where the tests were performed, the mean, maximum (e.g., max), the minimum (e.g., min), etc. of the tests results.

Figure 6:
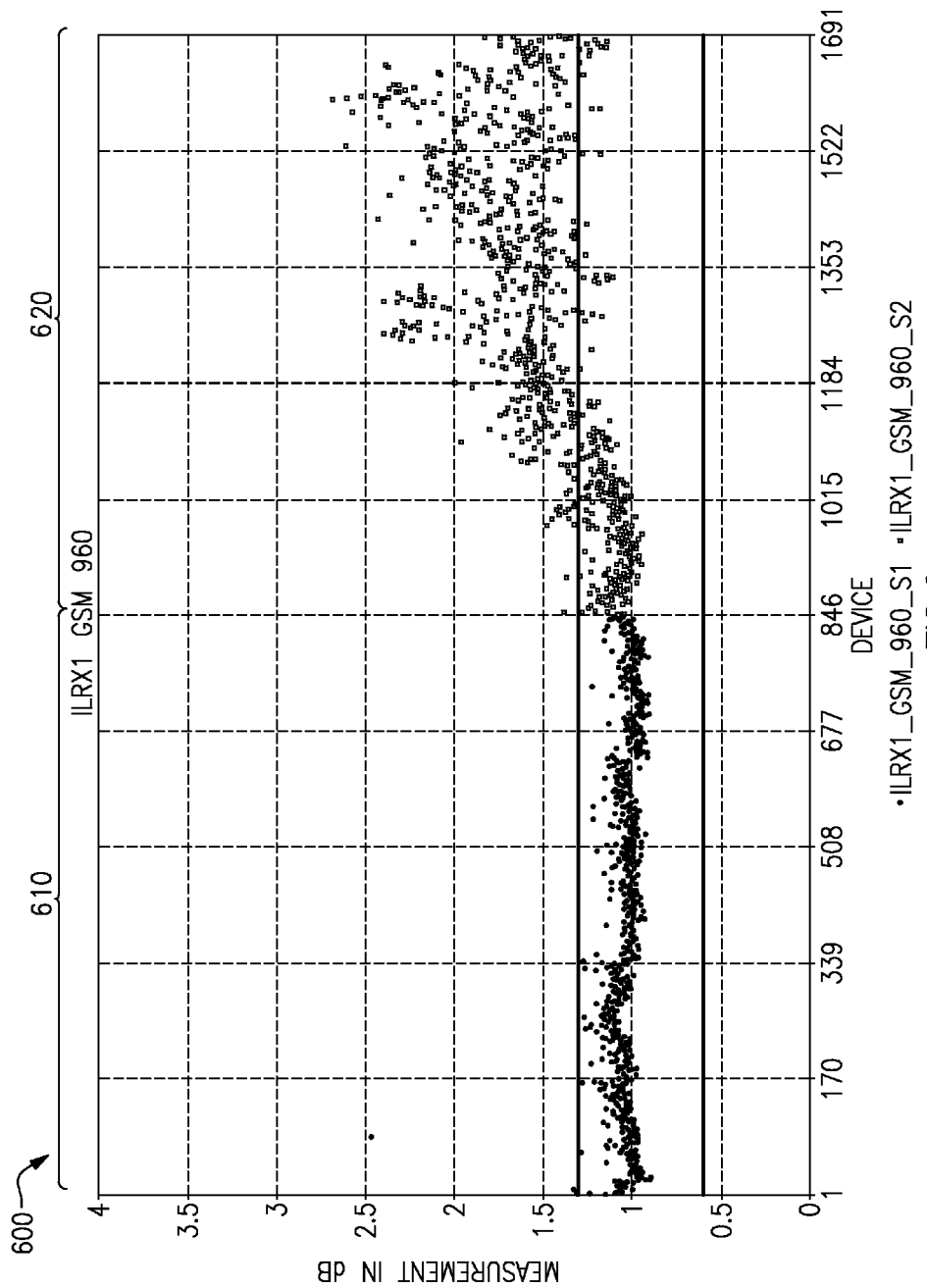
FIG. 6 is a diagram illustrating an example visual representation 600 according to one embodiment of the present disclosure.

FIG. 6 is a diagram illustrating an example visual representation 600 according to one embodiment of the present disclosure. The visual representation 600 may be presented, provided, and/or displayed by a test application (e.g., test application 135 illustrated in FIGS. 1 and 3). The visual representation 600 may be a graph that shows the test results for electronic devices and/or components tested at different sites (e.g., at different geographical locations, different plants, different buildings, etc.). Portion 610 of the visual representation 600 indicates the test results of tests performed at a first site. Each solid circle indicates a test result (e.g., a measurement in decibels (dB)) of an electronic device and/or component tested at the first site. Portion 620 of the visual representation 600 indicates the test results of tests performed at a second site. Each square indicates a test result (e.g., a measurement in decibels (dB)) of an electronic device and/or component tested at the second site. The visual representation 600 also includes two solid bold lines (e.g., two solid and/or thicker lines) that may indicate a passing range. For example, test results that fall between the two solid bold lines may be passing test results (e.g., results of tests that passed). By using the visual representation 600, a user may be able to determine that there may be a problem with one or more of the test apparatuses, test arms, and/or manufacturing process at the second site because the second site has a larger number of failed tests.

Figure 7:
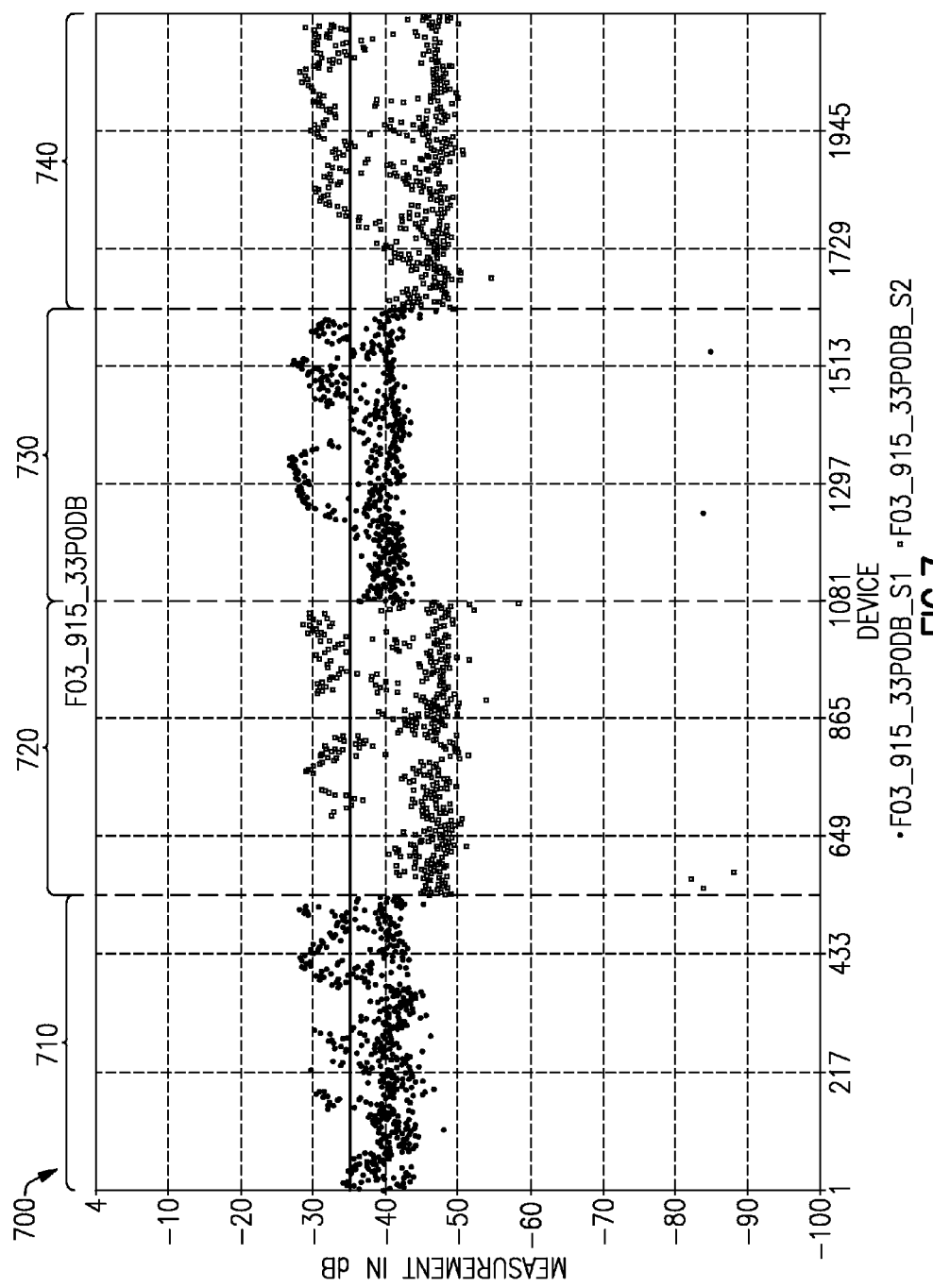
FIG. 7 is a diagram illustrating an example visual representation 700 according to one embodiment of the present disclosure.

FIG. 7 is a diagram illustrating an example visual representation 700 according to one embodiment of the present disclosure. The visual representation 700 may be presented, provided, and/or displayed by a test application (e.g., test application 135 illustrated in FIGS. 1 and 3). The visual representation 700 may be a graph that shows the test results for electronic devices and/or components tested by different test arms of a test apparatus. Portion 710 of the visual representation 700 indicates the test results for tests performed by a first test arm of the test apparatus. Each solid circle in the portion 710 indicates a test result (e.g., a measurement in decibels (dB)) of an electronic device and/or component tested by the first test arm. Portion 720 of the visual representation 700 indicates the test results for tests performed by a second test arm of the test apparatus. Each square in the portion 720 indicates a test result of an electronic device and/or component tested by the second test arm. Portion 730 of the visual representation 700 indicates test results for tests performed by a third test arm of the test apparatus. Each solid circle in the portion 730 indicates a test result of an electronic device and/or component tested by the third test arm. Portion 740 of the visual representation 700 indicates the test results for tests performed by a fourth test arm of the test apparatus. Each square in the portion 740 indicates a test result of an electronic device and/or component tested by the fourth test arm. The visual representation 700 also includes a solid bold line (a solid and/or thicker line) that may indicate a passing threshold. For example, test results are below the solid bold line may be passing test results (e.g., results of tests that passed).

Figure 8:
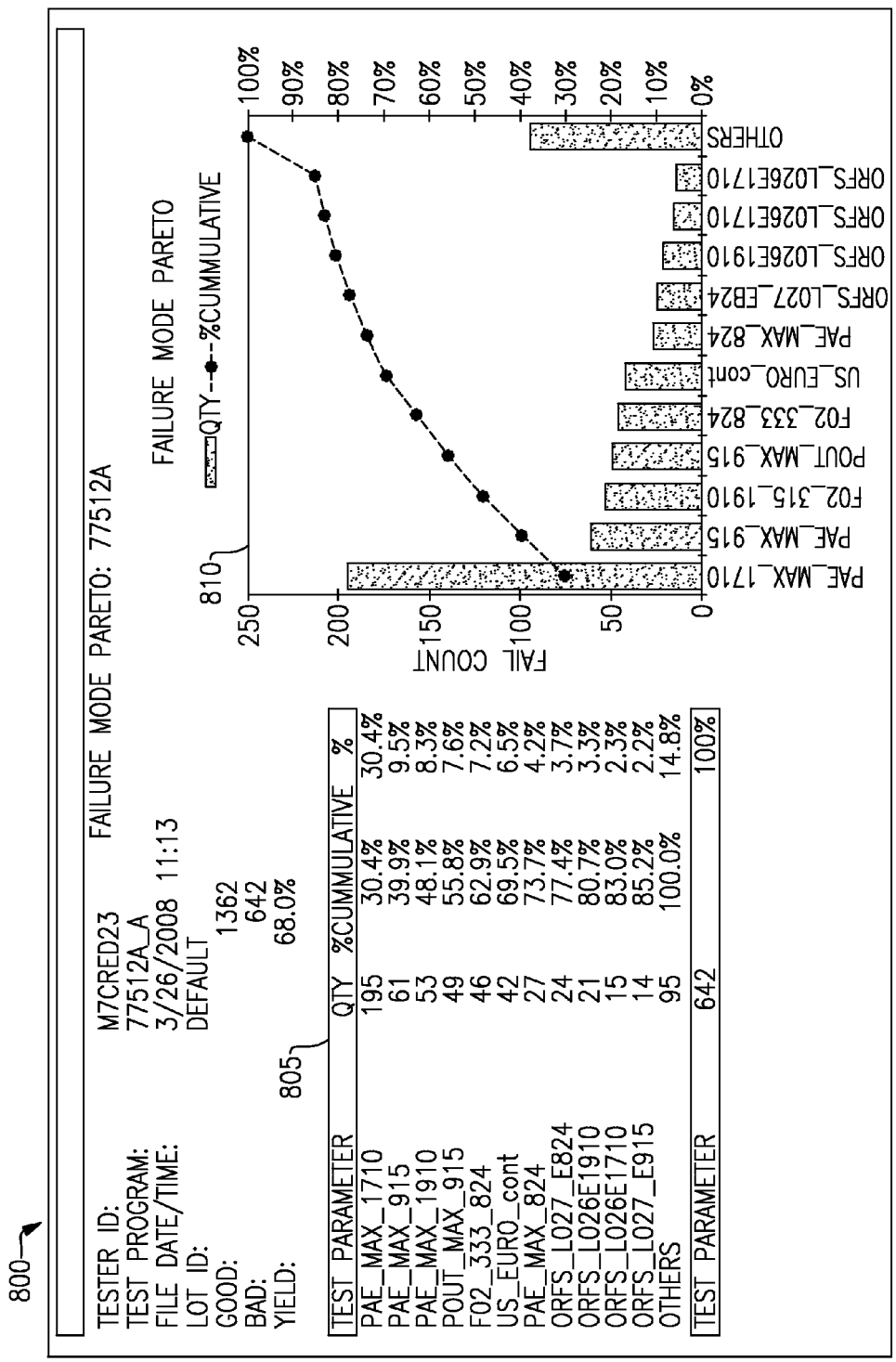
FIG. 8 is a diagram illustrating an example visual representation 800 according to one embodiment of the present disclosure.
Figure 9:
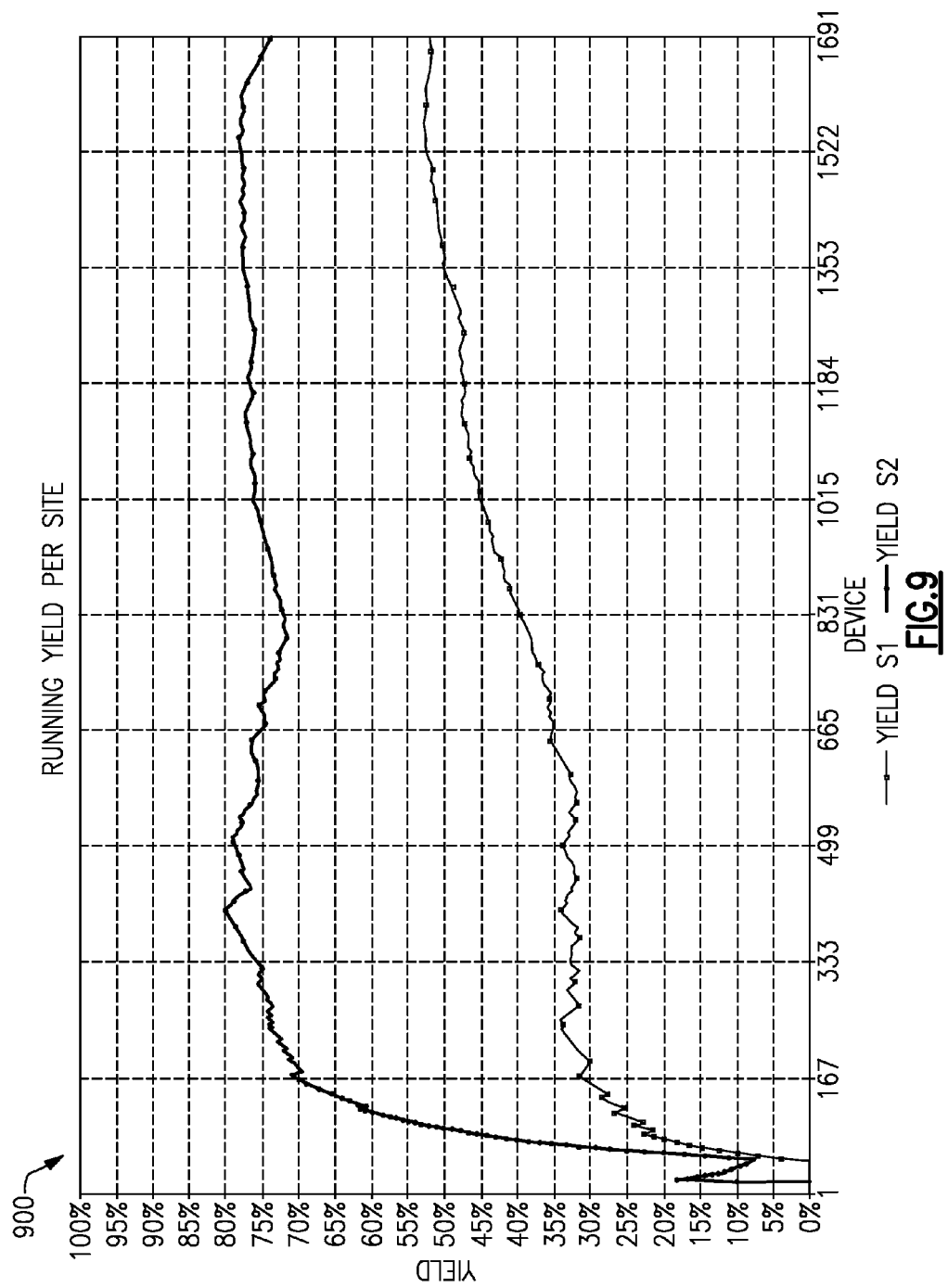
FIG. 9 is a diagram illustrating an example visual representation 900 according to one embodiment of the present disclosure.

FIG. 8 is a diagram illustrating an example visual representation 800 according to one embodiment of the present disclosure. The visual representation 800 may be presented, provided, and/or displayed by a test application (e.g., test application 135 illustrated in FIGS. 1 and 3). The visual representation includes table 805 and Pareto graph 810. The table 805 includes information about that number of failed tests and the percentage of failed tests for different individual tests (e.g., for test "PAE_MAX_1710," for test "PAE_MAX_915," etc.). The Pareto graph 810 includes a line graph and a bar chart that provides a visual representation of the data and/or information in the table 805.

FIG. 9 is a diagram illustrating an example visual representation 900 according to one embodiment of the present disclosure. The visual representation 900 may be presented, provided, and/or displayed by a test application (e.g., test application 135 illustrated in FIGS. 1 and 3). The visual representation 900 is a graph that displays running yield of different sites (e.g., different geographical locations). The thicker solid line in the visual representation 900 indicates the running yield for a first site. The thinner solid line in the visual representation indicates the running yield for a second site.

Figure 10:
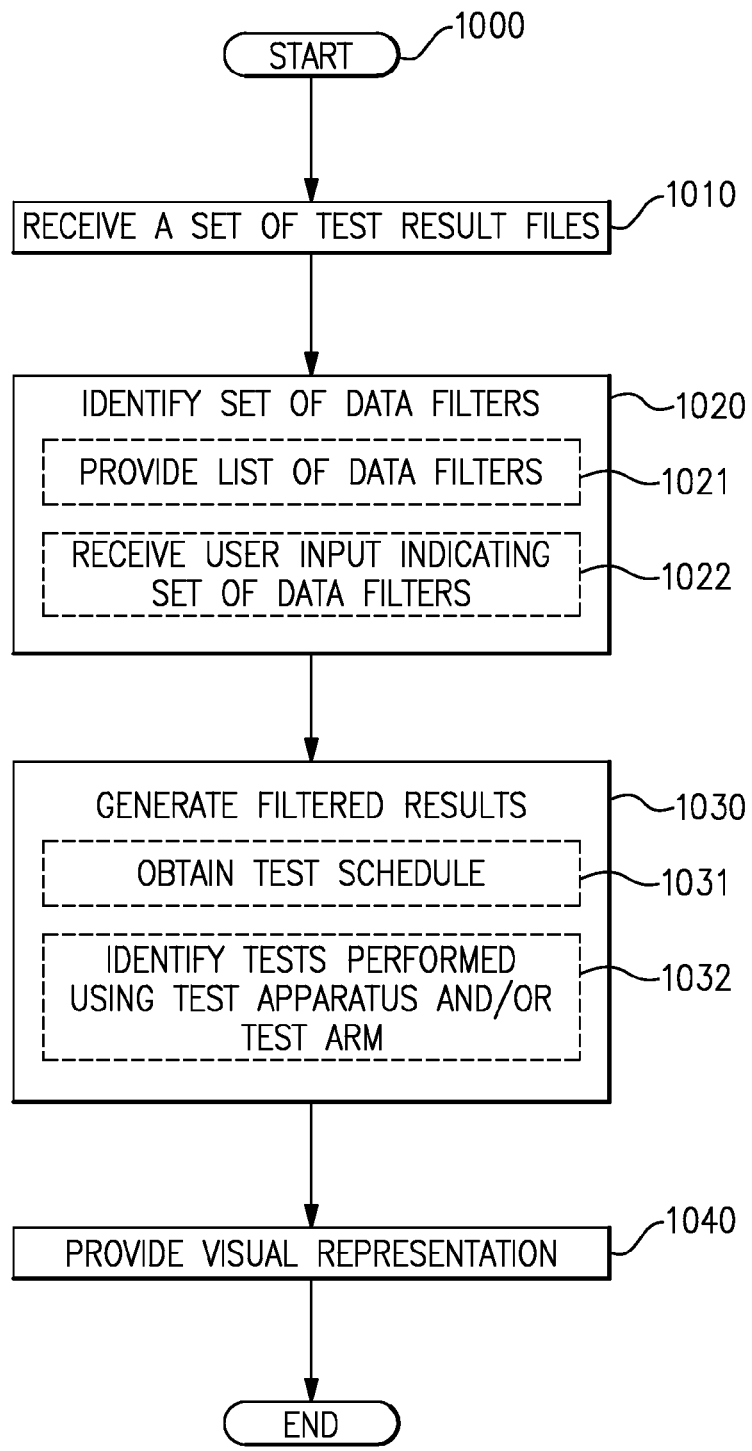
FIG. 10 is a diagram illustrating an example process 1000 for viewing, visualizing, processing, filtering, and/or analyzing test results according to one embodiment of the present disclosure.

FIG. 10 is a diagram illustrating an example process 1000 for viewing, visualizing, processing, filtering, and/or analyzing test results according to one embodiment of the present disclosure. The process 1000 may be performed by processing logic that comprises hardware (e.g., circuitry, dedicated logic, programmable logic, microcode, etc.), software (e.g., instructions run on a processor to perform hardware simulation), or a combination thereof. In one embodiment, process 1000 may be performed by a test application, as illustrated in FIGS. 1 and 3. In addition, the process 1000 could alternatively be represented as a series of interrelated states via a state diagram or events.

The process 1000 begins at block 1010 where the test application receives a set of test result files. For example, the test application may obtain the test result files from a database or from one or more test apparatuses. The test application may identify a set of data filters based on the set of test files at block 1020. In one embodiment, the test application may identify the set of test filters by providing a list of data filters to a user, as indicated by block 1021. The test application may receive user input indicating the set of data filters at block 1022. For example, the test application may receive user input indicating a subset of the list of data filters.

At block 1030, the test application may generate filtered results. For example, the test application may use the set of data filters to process, filter, and/or analyze the test results in the test result files. As discussed above, the data filters may allow the test application to identify test results of tests performed at one or more test locations, to identify test results of a particular type of test, to identify test results of tests performed on a type of electronic component/device, to identify test results that may indicate particular failures, and/or to identify particular parameters and/or values of the tests and/or test results. In one embodiment, generating the filtered results may include obtaining a test schedule, as indicated by block 1031. For example, the test application may receive a test schedule via user input and/or by accessing data (e.g., a file including the test schedule) on a database or other computing device. At block 1032, the test application may use the data filters and the test schedule to identify tests performed by a particular test apparatus and/or test arm. The test application may provide (e.g., present and/or display) a visual representation (e.g., images, text, charts, graphs, etc.) of the filtered test results to a user at block 1040. For example, the test application may display a GUI that includes the visual representation (as discussed above).

Figure 11:
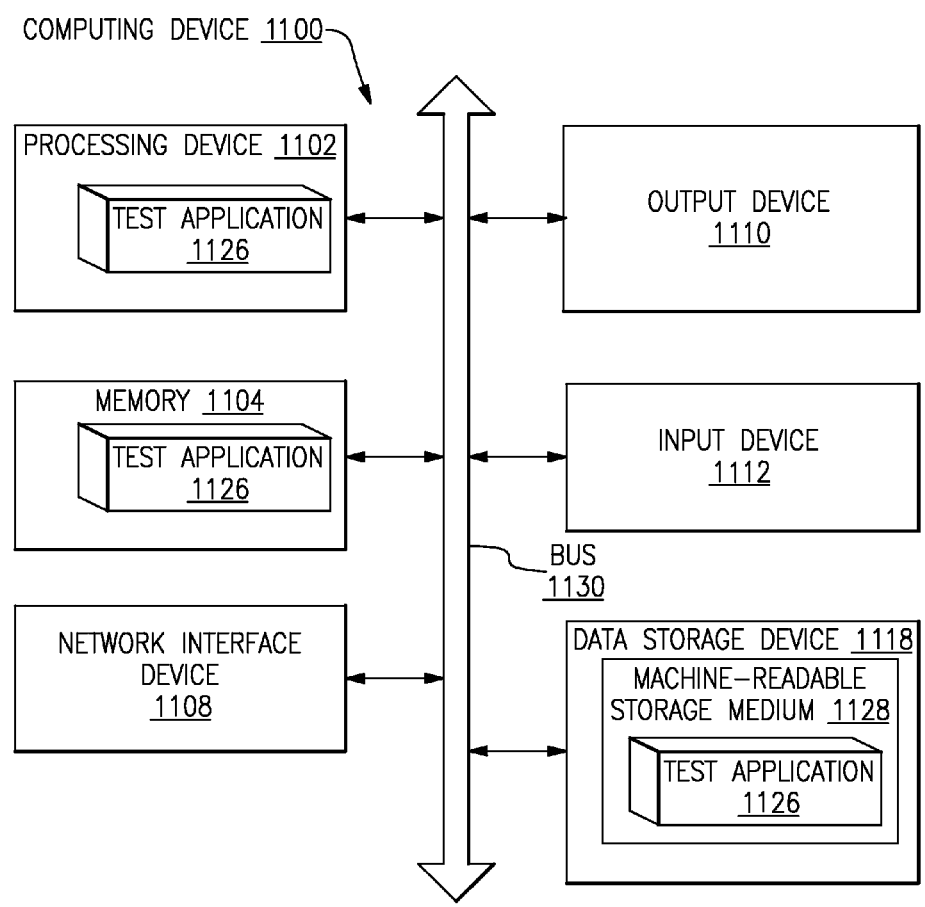
FIG. 11 illustrates a diagrammatic representation of a machine in the example form of a computing device.

FIG. 11 illustrates a diagrammatic representation of a machine in the example form of a computing device 1100 within which a set of instructions, for causing the machine to perform any one or more of the methodologies discussed herein, may be executed. The computing device 1100 may be a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing device 1100 includes a processing device (e.g., a processor, a central processing unit (CPU), etc.) 1102, a main memory 1104 (e.g., read-only memory (ROM), flash memory, dynamic random access memory (DRAM) such as synchronous DRAM (SDRAM)), a network interface device 1108, an output device, 1110, an input device 1112, and a data storage device 1118, which communicate with each other via a bus 1130.

Processing device 1102 represents one or more general-purpose processing devices such as a microprocessor, central processing unit, or the like. More particularly, the processing device 1102 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1102 may also be one or more special-purpose processing devices such as an application specific integrated circuit (ASIC), a field programmable gate array (FPGA), a digital signal processor (DSP), network processor, or the like. The processing device 1102 is configured to execute test application 1126 for performing the operations and steps discussed herein.

The computing device 1100 may further include a network interface device 1108 which may communicate with a network (e.g., network 105 illustrated in FIG. 1). The computing device 1100 also may include an output device 1110 (e.g., a liquid crystal display (LCD) or a cathode ray tube (CRT)), and an input device 1112 (e.g., a mouse, a keyboard, etc.). In one embodiment, the output device 1110 and the input device 1112 may be combined into a single component or device (e.g., an LCD touch screen).

The data storage device 1118 may include a computer-readable storage medium 1128 on which is stored one or more sets of instructions (e.g., test application 1126) embodying any one or more of the methodologies or functions described herein. The test application 1126 may also reside, completely or at least partially, within the main memory 1104 and/or within the processing device 1102 during execution thereof by the computing device 1100. The main memory 1104 and the processing device 1102 may also constitute computer-readable media. The instructions may further be transmitted or received over the via the network interface device 1108.

While the computer-readable storage medium 1128 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts may be performed as a single step and/or phase. Also, certain steps and/or phases may be broken into additional sub-components to be performed separately. In some instances, the order of the steps and/or phases may be rearranged and certain steps and/or phases may be omitted entirely. Also, the methods described herein are to be understood to be open-ended, such that additional steps and/or phases to those shown and described herein may also be performed.

Some portions of the present disclosure are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

Some aspects of the systems and methods described herein may advantageously be implemented using, for example, computer software, hardware, firmware, or any combination of computer software, hardware, and firmware. Computer software may comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that may be implemented using software to be executed on a general purpose computer may also be implemented using a different combination of hardware, software, or firmware. For example, such a module may be implemented completely in hardware using a combination of integrated circuits. Alternatively or additionally, such a feature or function may be implemented completely or partially using specialized computers designed to perform the particular functions described herein rather than by general purpose computers.

Multiple distributed computing devices may be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that may direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), magnetic or optical cards, flash memory, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations. Furthermore, the terms "first," "second," "third," "fourth," etc., as used herein are meant as labels to distinguish among different elements and may not necessarily have an ordinal meaning according to their numerical designation.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein may be applied to other methods and systems, and are not limited to the methods and systems described above, and elements and acts of the various embodiments described above may be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method of analyzing test data at a computing device comprising memory, a processor communicatively coupled to the memory and a non-transitory computer readable storage medium, the method comprising:
receiving a set of test result files, the set of test result files including a plurality of test results of one or more tests performed on one or more electronic devices, generated by a plurality of test apparatuses;
identifying a set of data filters based on one or more of the set of test result files or user input received via a graphical user interface of a computing device;
generating filtered results based on the set of data filters and the set of test result files, the filtered results including one or more of a subset of the plurality of test results or reordered test results; and
identifying a malfunctioning test apparatus from the plurality of test apparatus by providing a visual representation of the filtered results via the graphical user interface of the computing device.

2. The method of claim 1 wherein identifying the set of filters comprises providing a list of data filters based on the set of test result files.

3. The method of claim 2 wherein identifying the set of filters further comprises receiving the user input, the user input indicating the set of data filters.

4. The method of claim 1 wherein the plurality of test results are generated by one or more test apparatuses, the one or more test apparatuses including a plurality of test arms.

5. The method of claim 4 wherein generating the filtered results comprises obtaining a test schedule of a plurality of tests, the test schedule including an order of the plurality of tests and identifying the one or more test apparatuses and the plurality of test arms.

6. The method of claim 5 wherein generating the filtered results further comprises identifying tests performed using a first test arm of the plurality of test arms based on the test schedule.

7. The method of claim 5 wherein generating the filtered results further comprises identifying tests performed by a first testing apparatus from the one or more testing apparatuses based on the test schedule.

8. The method of claim 1 wherein the set of data filters comprises a first data filter for identifying a test location.

9. The method of claim 1 wherein the set of data filters comprises a first data filter for identifying a type of a test.

10. The method of claim 1 wherein the set of data filters comprises a first data filter for identifying a type of a failure.

11. The method of claim 1 wherein the set of data filters comprises a first data filter for identifying a type of a component being tested.

12. The method of claim 1 wherein the set of data filters comprises a first data filter for identifying an individual test.

13. The method of claim 1 wherein the visual representation comprises one or more of text, an image, a table, a graph, a chart, or a list.

14. The method of claim 1 wherein providing the visual representation comprises communicating with a spreadsheet application to generate the visual representation.

15. The method of claim 1, wherein the reordered test results comprises one or more of plurality of test results in a different order.

16. A system for analyzing test data, the system comprising:
a memory; and
a processor communicatively coupled to the memory, the processor configured to receive a set of test result files, the set of test result files including a plurality of test results of one or more tests performed on one or more electronic devices, generated by a plurality of test apparatuses, identify a set of data filters based on one or more of the set of test result files or user input received via a graphical user interface of a computing device, generate filtered results based on the set of data filters and the set of test result files, the filtered results including one or more of a subset of the plurality of test results or reordered test results, and identify a malfunctioning test apparatus from the plurality of test apparatus by providing a visual representation of the filtered results via the graphical user interface of the computing device.

17. The system of claim 16 wherein the processor is configured to identify the set of filters by providing a list of data filters based on the set of test result files.

18. The system of claim 17 wherein the processor is further configured to identify the set of filters by receiving the user input, the user input indicating the set of data filters.

19. The system of claim 16 wherein the processor is configured to generate the filtered results by obtaining a test schedule of a plurality of tests, the test schedule including an order of the plurality of tests and identifying the one or more test apparatuses associated with each of the plurality of tests.

20. A non-transitory computer readable storage medium comprising instructions that, when executed by a processor, cause the processor to perform operations comprising:
receiving a set of test result files, the set of test result files including a plurality of test results of one or more tests performed on one or more electronic devices, generated by a plurality of test apparatuses;
identifying a set of data filters based on one or more of the set of test result files or user input received via a graphical user interface of a computing device;
generating filtered results based on the set of data filters and the set of test result files, the filtered results including one or more of a subset of the plurality of test results or reordered test results; and
identifying a malfunctioning test apparatus from the plurality of test apparatus by providing a visual representation of the filtered results via the graphical user interface of the computing device.

* * * * *